US011872418B2

(12) United States Patent
McFaddin

(10) Patent No.: US 11,872,418 B2
(45) Date of Patent: Jan. 16, 2024

(54) FALL ARREST WELDABLE STAPLE

(71) Applicant: The United States of America, as represented by the Secretary of the Navy, Crane, IN (US)

(72) Inventor: Donald A McFaddin, Williams, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/854,502

(22) Filed: Jun. 30, 2022

(65) Prior Publication Data

US 2023/0015160 A1 Jan. 19, 2023

Related U.S. Application Data

(60) Provisional application No. 63/218,594, filed on Jul. 6, 2021.

(51) Int. Cl.
*A62B 35/00* (2006.01)

(52) U.S. Cl.
CPC ................................ *A62B 35/0068* (2013.01)

(58) Field of Classification Search
CPC ................................................. A62B 35/0068
See application file for complete search history.

(56) References Cited

U.S. PATENT DOCUMENTS

| | | | | |
|---|---|---|---|---|
| 5,320,193 A * | 6/1994 | Bongiovanni | E04G 21/3276<br>248/237 |
| 11,118,363 B1 * | 9/2021 | Allen | E04G 21/3219 |
| 2003/0006094 A1 * | 1/2003 | Cole | A62B 35/0087<br>182/36 |
| 2018/0142481 A1 * | 5/2018 | Gurtler | A62B 35/0056 |
| 2020/0188710 A1 * | 6/2020 | Roseveare, Jr. | E04G 21/3276 |
| 2022/0298890 A1 * | 9/2022 | Haggart | E21B 40/00 |

* cited by examiner

*Primary Examiner* — Amy J. Sterling
(74) *Attorney, Agent, or Firm* — Naval Surface Warfare Center, Crane Division; Christopher Feigenbutz

(57) ABSTRACT

Provided is a Fall Arrest Staple that includes a slanted base with a flat welding surface and an integral ring section extending from the base that is constructed from aluminum with a maximum internal radii that is capable of accepting a small carabineer. The staple can be welded to an aluminum pole, such as a 4"OD×0.25" mast that is found on a ship. Advantages provided by the staple include the ability of welding in a perpendicular orientation to a ship deck (in the direction of a fall), welding to a curved aluminum backing plate, and the use of the staple with a curved backing plate that can be welded directly to a ship mast.

9 Claims, 7 Drawing Sheets

FALL ARREST WELDABLE STAPLE

CROSS-REFERENCE TO RELATED APPLICATIONS

The present application claims priority to U.S. Provisional Patent Application Ser. No. 63/218,594, filed Jul. 6, 2021, entitled “FALL ARREST WELDABLE STAPLE,” the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200565155O2) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The field of invention relates generally to safety equipment. More particularly, it pertains to fall arrest staples to prevent falls.

BACKGROUND

Fall arrest staples (FAS) or pad eyes are needed to stop falls if they should happen from high areas, such as from the mast of a ship. The staple must be welded to the aluminium superstructure of the ship in order to create a permanent attachment point for connecting fall arrest equipment/lanyards. The fall arrest equipment is designed to stop the person from falling and hitting the next deck, other personnel, and/or equipment below.

The problem with the existing FAS design was first discovered during installation on PC 7 USS Squall, where an in-situ pull test of the FAS was required to demonstrate safety requirement compliance. One of the standards to be met by the FAS was established by the American National Standards Institute (ANSI), and requires a 3600 pound working load with no permanent deformation and a design load of 5000 lbs. with visible permanent deformation but with no failure. It was determined that pulling the FAS to a 3600 pounds load, per the safety requirement, would likely result in the FAS component failure. A Ship Installation Drawing (SID) package review verified this issue applied to all PC-GMS installations. The assessment of likely failure was due to two major issues: 1) the FAS design does not take into account the yield strength of its aluminum construction, which was required to secure it to the PC mast, also made of aluminum; and 2) the aluminum FAS design was intended to be constructed from A-36 steel, which is stronger than the designed aluminum staple. As shown above, it is clear that a new design is required that meets or exceeds the standards put forth by the ANSI.

SUMMARY OF THE INVENTION

The present invention relates to a Fall Arrest Staple (FAS). The FAS includes a slanted base with a flat welding surface and an integral ring section extending from the base that is constructed from aluminum with a maximum internal radii that is capable of accepting a small carabiner. The FAS can be welded to an aluminum pole, such as a 4" OD×0.25" mast that is found on a ship. Advantages provided by the FAS includes the ability of welding in a perpendicular orientation to a ship deck (in the direction of a fall), welding to a curved aluminum backing plate, and the use of the staple with a curved backing plate that can be welded directly to a ship mast.

According to an illustrative embodiment of the present disclosure, it is an object of the invention to provide a fall arrest staple that has all the advantages of the prior art and none of the disadvantages.

According to a further illustrative embodiment of the present disclosure, it is an object of the invention to provide a fall arrest staple that meets FAS Design per ANSI Z359.1-2007, FAS Design per Department of the Navy (DON) Fall Protection Guide, OSHA Requirements 1915.159(a)(9), and ANSI Requirements Anchorage Connector Component per Z359.1-2007.

According to a yet another illustrative embodiment of the present disclosure, it is an object of the invention to provide a fall arrest staple that produces 0.000 inch deformation at a 3600 pound vertical or horizontal load and a 0.0013 maximum deformation at a 5000 pound vertical or horizontal load.

According to a yet another illustrative embodiment of the present disclosure, it is an object of the invention to provide a fall arrest staple that can be welded in a perpendicular orientation to a ship deck.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1A:
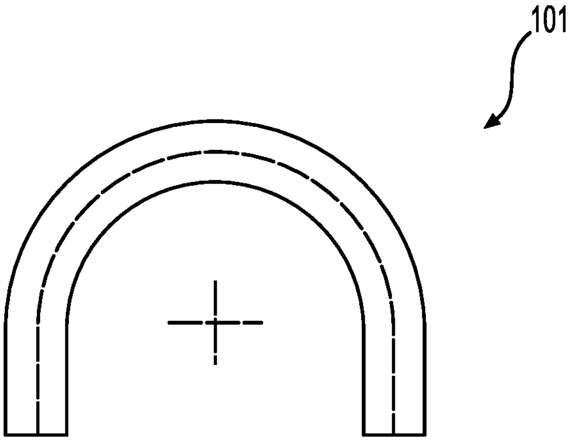
FIG. 1A shows a view of the original prior art FAS design.

The embodiments of the invention described herein are not intended to be exhaustive or to limit the invention to precise forms disclosed. Rather, the embodiments selected for description have been chosen to enable one skilled in the art to practice the invention.

Generally, provided is a Fall Arrest Staple (FAS) for preventing a fall. In one illustrative embodiment, provided is a fall arrest staple for attachment to a pole comprising: a slanted base with a flat welding surface; and an integral ring section extending from the base with an internal radii that accepts a carabiner.

In another illustrative embodiment, provided is a fall arrest staple for attachment to a pole comprising: a slanted base with a flat welding surface; and an integral ring section extending from the base; wherein the base has a length of 5.25 inches and is constructed from 5/8 5456 or 5086 aluminum; wherein the ring section has a maximum internal radii of 0.02 and accepts a carabiner; and wherein the fall arrest staple produces 0.000 inch deformation at a 3600 pound vertical or horizontal working load and a 0.0013 maximum deformation at a 5000 pound vertical or horizontal working load.

In another illustrative embodiment, provided is a fall arrest system comprising: a fall arrest staple comprising a slanted base with a flat welding surface and an integral ring section extending from the base; wherein the base has a length of 5.25 inches and is constructed from 5/8 5456 or 5086 aluminum; wherein the ring section has a maximum internal radii of 0.02; a pole secured to a surface; and a carabiner; wherein the fall arrest staple is welded to the pole and the carabiner is attached to the integral ring section of the fall arrest staple; and wherein the fall arrest staple produces 0.000 inch deformation at a 3600 pound vertical or horizontal working load and a 0.0013 maximum deformation at a 5000 pound vertical or horizontal working load.

In an illustrative embodiment the staple is welded to a 4"OD×0.25" ship mast. In an illustrative embodiment the staple is welded in a perpendicular orientation to a ship deck. In an illustrative embodiment the staple is welded in a perpendicular orientation to a ship deck. In an illustrative embodiment the staple is welded with a slanted design at a 60 degree offset from a pad eye or a hand grab.

Testing and Analysis

An analysis of existing FAS designs and their limitations was undertaken and eventually lead to the inventive FAS as described herein. The following test standards were utilized to perform the tests as described in more detail below.

FAS Design per ANSI Z359.1-2007, para 3.2.5

> "When tested in accordance with 4.3.6, an anchorage connectors shall be capable of withstanding (without breaking) a 5,000-pound (22.2 kN) load multiplied by the maximum number of personal fall arrest systems that may be attached to the anchorage connector."—"Connector elements integral to or part of the anchorage connector shall be capable of withstanding a 3,600-pound (16 kN) load without cracking, breaking, or permanent deformation visible to the eye."

FAS Design per Department of the Navy (DON) Fall Protection Guide, May 2015, para 8.2.3.2

> "All personal fall-arrest equipment used shall meet the requirements of ANSI Z359 Fall Protection Code/Standards."—"Anchorage is the rigid part of a building or structure such as a beam, column, floor, or equipment and shall withstand a minimum force (breaking strength) of 5,000 pounds, or engineered twice the maximum arresting force by the Qualified Person for Fall Protection (a secure point for attaching fall arrest system)."

OSHA Requirements 1915.159(a)(9)

> "Anchorages shall be capable of supporting at least 5,000 pounds (22.24 Kn) per employee attached, or shall be designed, installed, and used as follows: 1915.159(a)(9)(i) as part of a complete personal fall arrest system which maintains a safety factor of at least two; and 1915.159(a)(9)(ii) under the direction and supervision of a qualified person."

ANSI Requirements Anchorage Connector Component per Z359.1-2007, para 3.2.5

> "When tested in accordance with 4.3.6, an anchorage connectors shall be capable of withstanding (without breaking) a 5,000-pound (22.2 kN) load multiplied by the maximum number of personal fall arrest systems that may be attached to the anchorage connector."—"Connector elements integral to or part of the anchorage connector shall be capable of withstanding a 3,600-pound (16 kN) load without cracking, breaking, or permanent deformation visible to the eye."

Figure 1B:
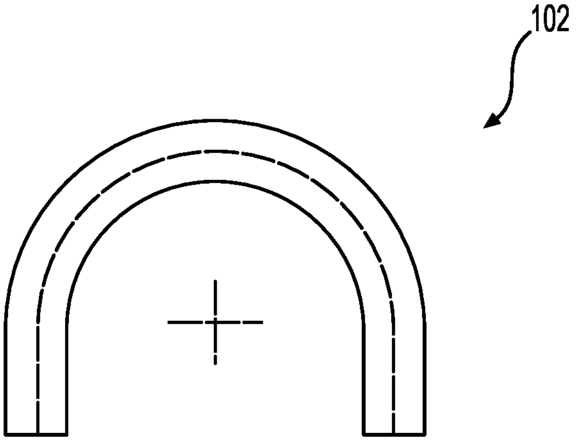
FIG. 1B shows a view of the FAS with a thicker rod design.
Figure 1C:
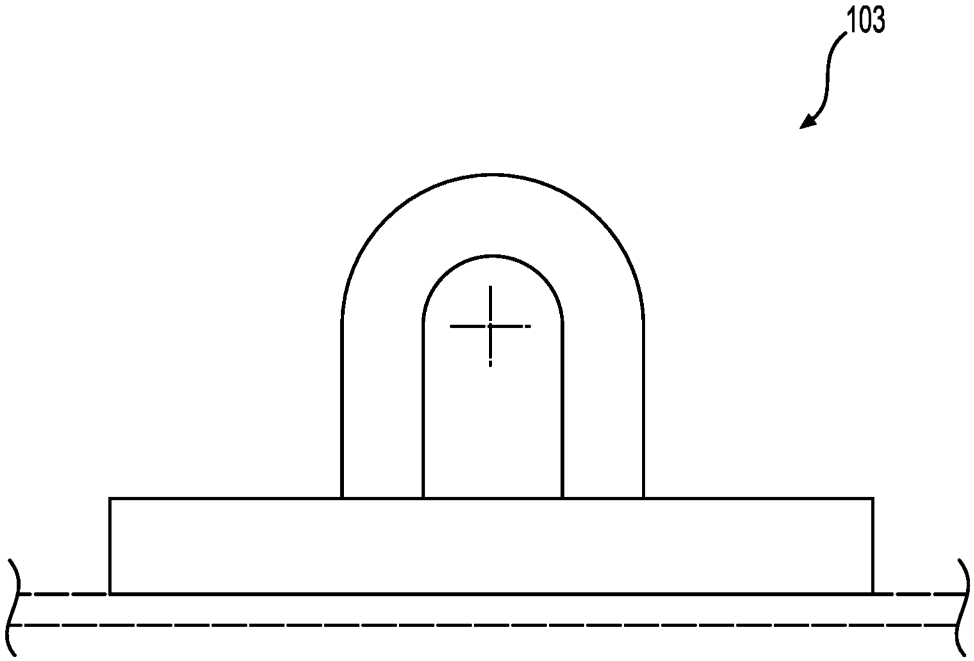
FIG. 1C shows a view of the first new FAS design.
Figure 1D:
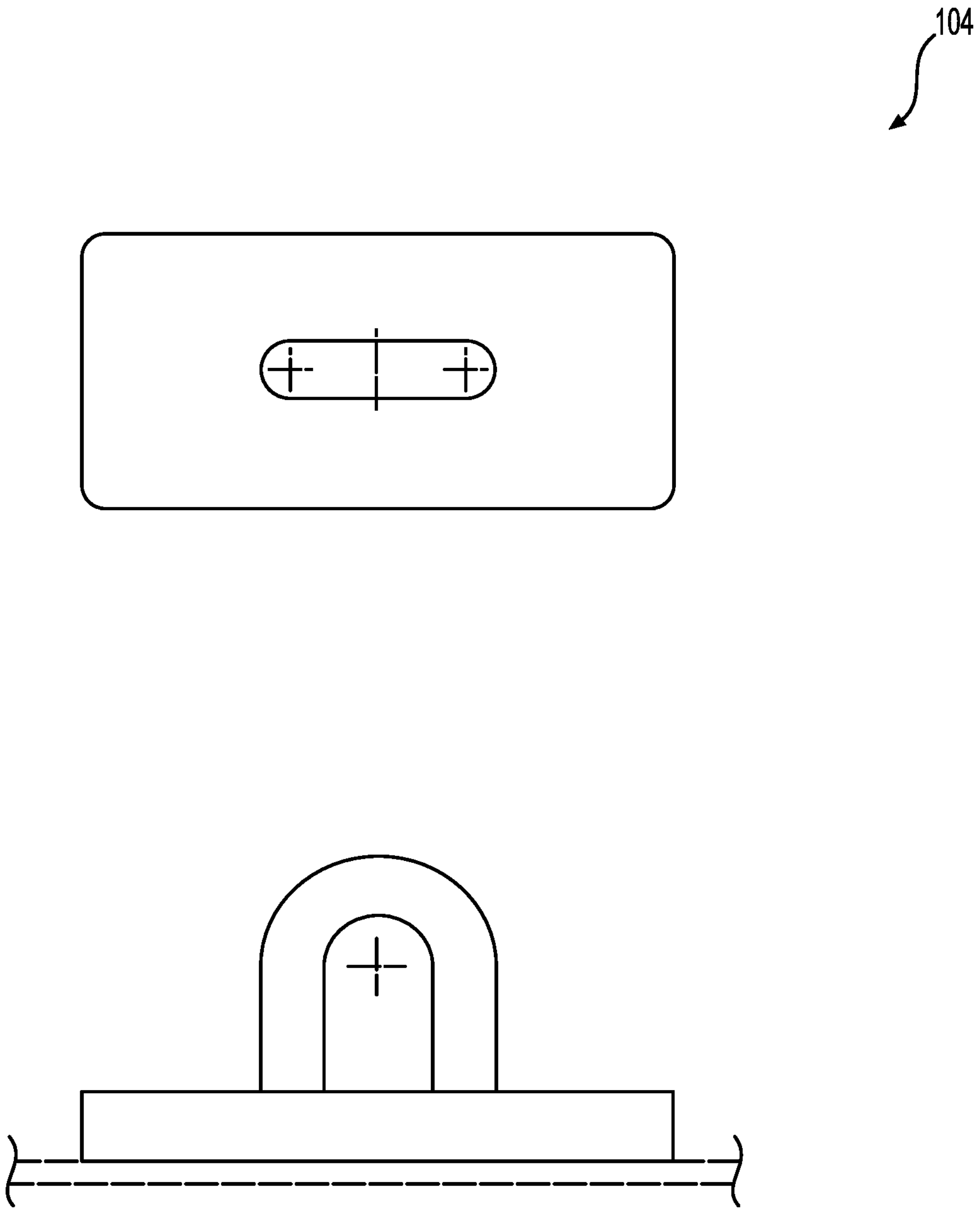
FIG. 1D shows a view of the second new bimetallic FAS design.

With the above standards as the required parameters, a basic Finite Element Analysis (FEA) was conducted on various fall arrest weldable staples. FIG. 1A shows the original FAS design 101, FIG. 1B shows a thicker rod design 102, FIG. 1C shows a first new FAS 103, and FIG. 1D shows a second new bimetallic FAS 104. The original FAS design 101 comprises a ½ inch diameter section of round bar with three inches between ends and a 1.5 radius. The thicker rod design 102 comprises a ⅝ inch diameter section of round bar with three inches between ends and a 1.5 radius. The first new FAS 103 comprises a ⅝ inch diameter section of round bar with 1⅜ inches between ends and a 9/16 radius. The second new bimetallic FAS 104 is the same design as the first new FAS 103 but is made of a bimetallic aluminum 5456 or 5086 carbon steel material. A series of tests were performed on yield and ultimate stresses for the existing staples, which are detailed in Table 1 and summarized in Table 2.

TABLE 1

Yield and Ultimate Stresses

| | ORIGINAL FAS | THICKER ROD | 1ST NEW FAS | 2ND NEW FAS |
|---|---|---|---|---|
| 3600 lbs. Vertical | All samples failed at 2210 lbs. | One sample failed, and two yielded at 3600 lbs. All failed at 500 lbs. | All samples yield at 3600 lbs. and 5000 lbs. | All samples yield at 3600 lbs. and 5000 lbs. |
| 3600 Horizontal | Samples Failed between 1600-2000 lbs. | All samples yielded at 3600 lbs. All failed at 5000 lbs. | All samples yield at 3600 lbs. and 5000 lbs. | All samples yield at 3600 lbs. and 5000 lbs. |

TABLE 2

| Yield and Ultimate Stresses Summary<br>Yield and Ultimate Stresses of Existing Designs |
|---|
| One 5/8" Rod fails at 3600 lbs vertical (Face affixed) |
| Remaining 5/8" Rods yield at 3600 lbs vertical |
| All 5/8" Rods yield at 3600 lbs horizontal |
| All 5/8 Rods fail at 5000 lbs vertical |

Figure 2:
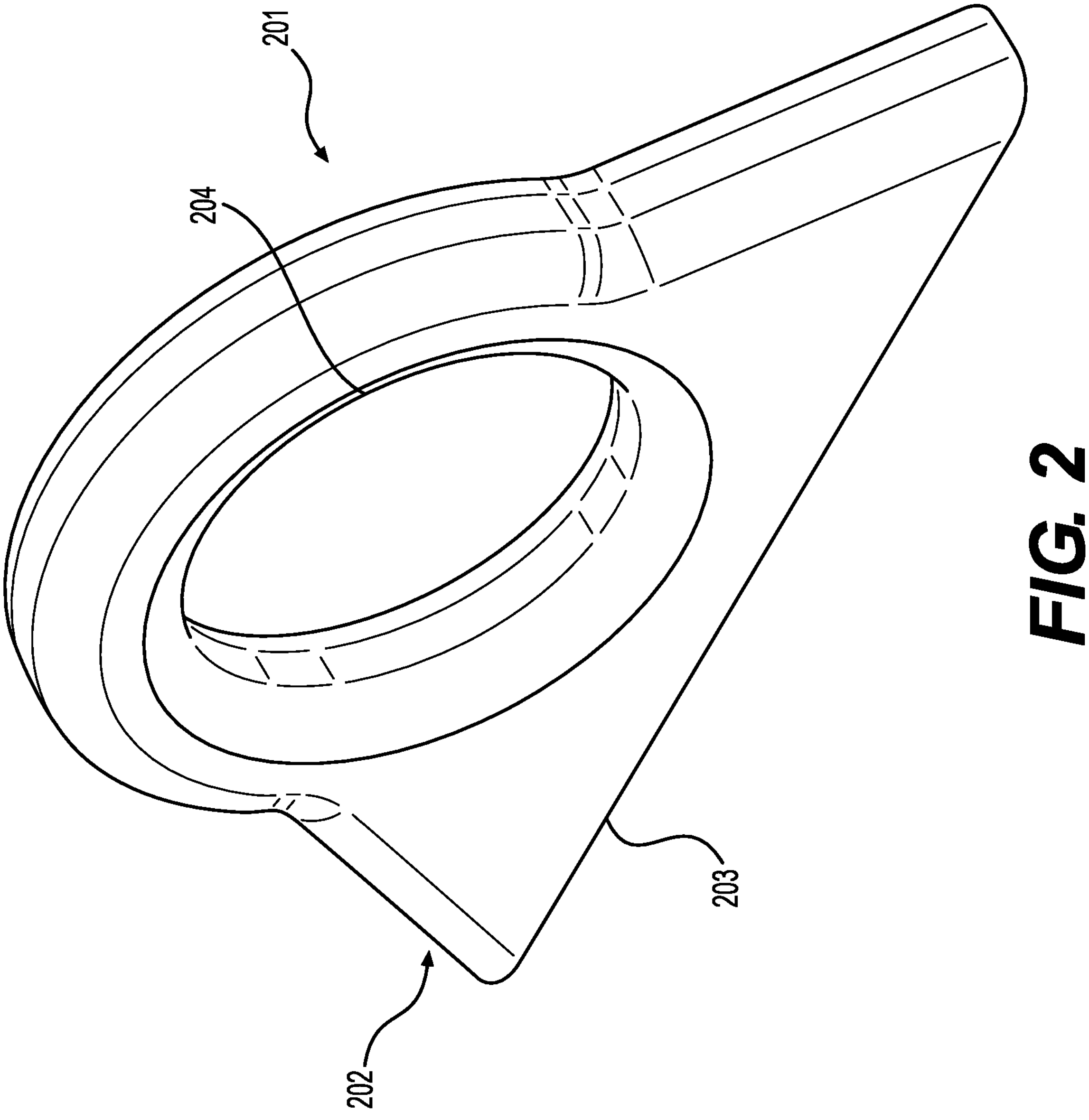
FIG. 2 shows a perspective view of an embodiment of the inventive fall arrest weldable staple.
Figure 3:
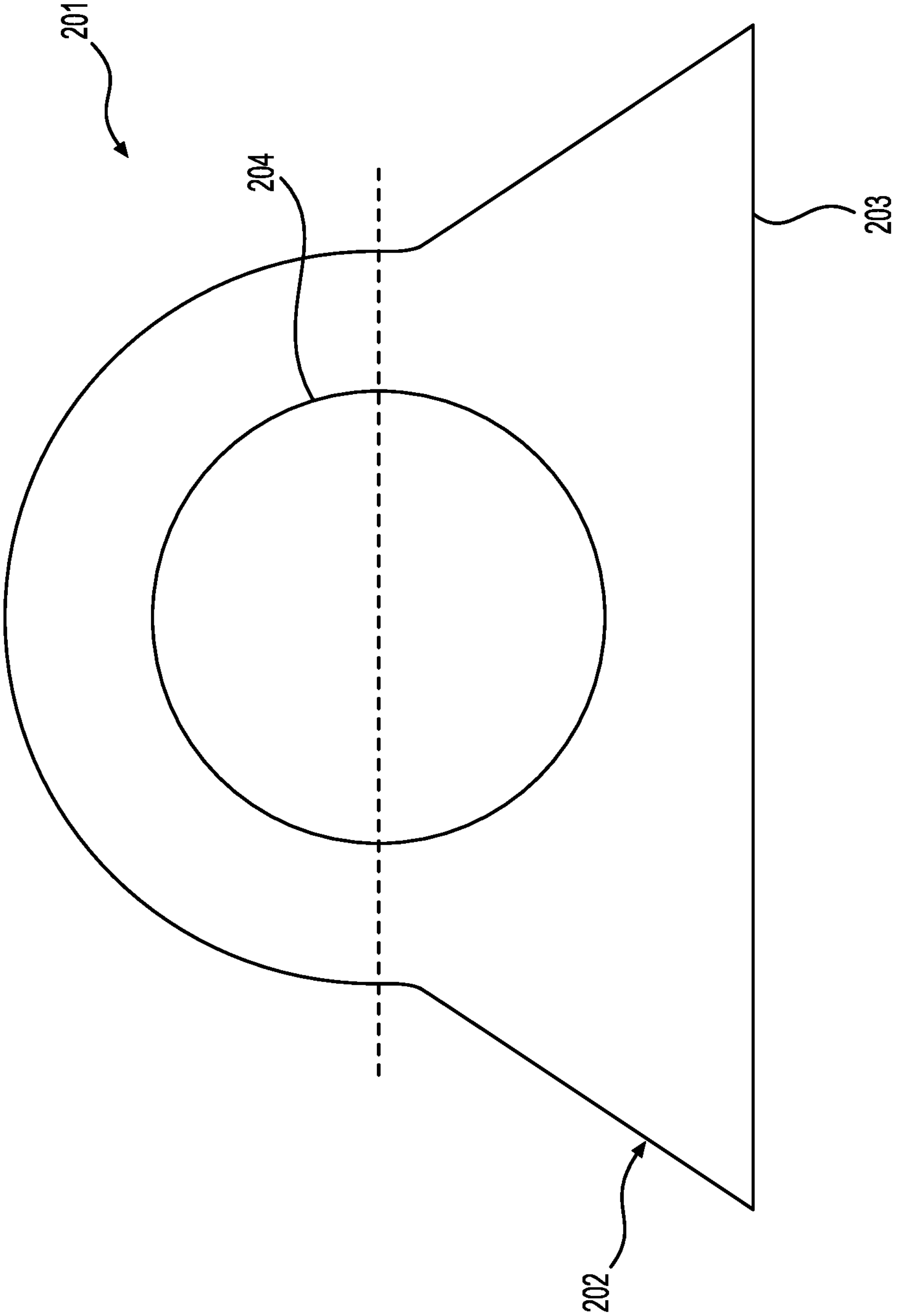
FIG. 3 shows a front view of an embodiment of the inventive fall arrest weldable staple.

As shown above, all designs presented did not meet the yield and ultimate stress requirements. As such, a new design was required. FIGS. 2 and 3 show views of an embodiment of the inventive fall arrest weldable staple 201. In an illustrative embodiment of the inventive FAS 201 comprises a slanted base 202 with a flat welding surface 203 having a length of 5.25 inches and an integral ring 204 section extending from the base 202 constructed from 5/8 5456 or 5086 aluminum with a maximum internal radii of 0.02 that is capable of accepting a small carabiner. In an illustrative embodiment, the slanted base 202 comprises a 56 degree angle. The staple 201 can be welded to a pole, such as a 4" OD×0.25" mast that is found on a ship. Advantages provided by the staple 201 include the ability of welding in a perpendicular orientation to a ship deck (in the direction of a fall), welding to a curved aluminum backing plate, and the use of the staple 201 with a curved backing plate that can be welded directly to a ship mast. The inventive FAS 201 was subjected to the same tests, with the results provided in Table 3.

TABLE 3

| Yield and Ultimate Stresses<br>MAXIMUM YIELD AND<br>ULTIMATE STRESSES<br>OF INVENTIVE FAS<br>UNDER VERTICAL AND<br>HORIZONTAL LOAD |
|---|
| .000 deformation at 3600 lbs. |
| .0013 maximum deformation at 5000 lbs. Does not fail. |

Figure 4:
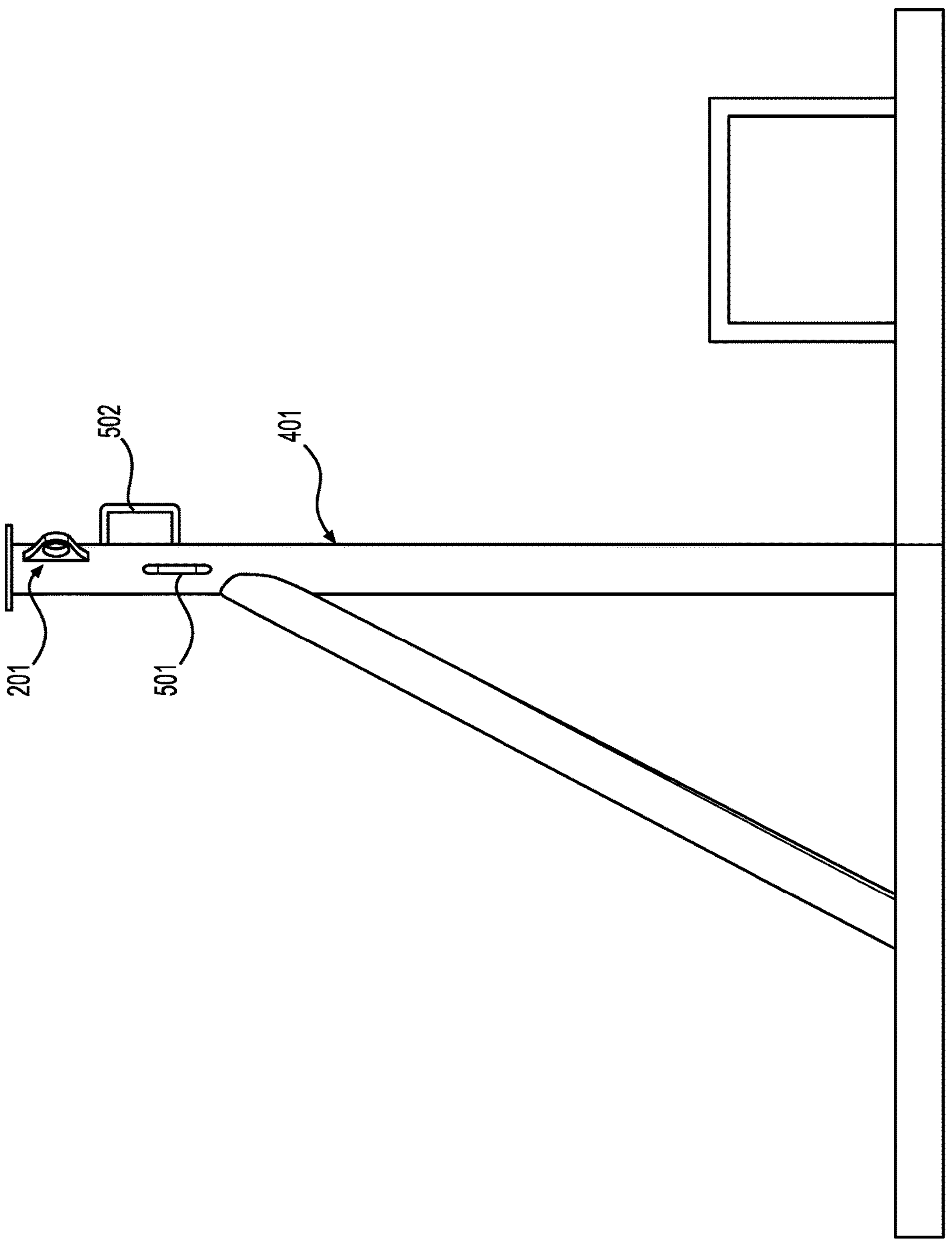
FIG. 4 shows a side view of an embodiment of the inventive fall arrest weldable staple installed on a pole.
Figure 5:
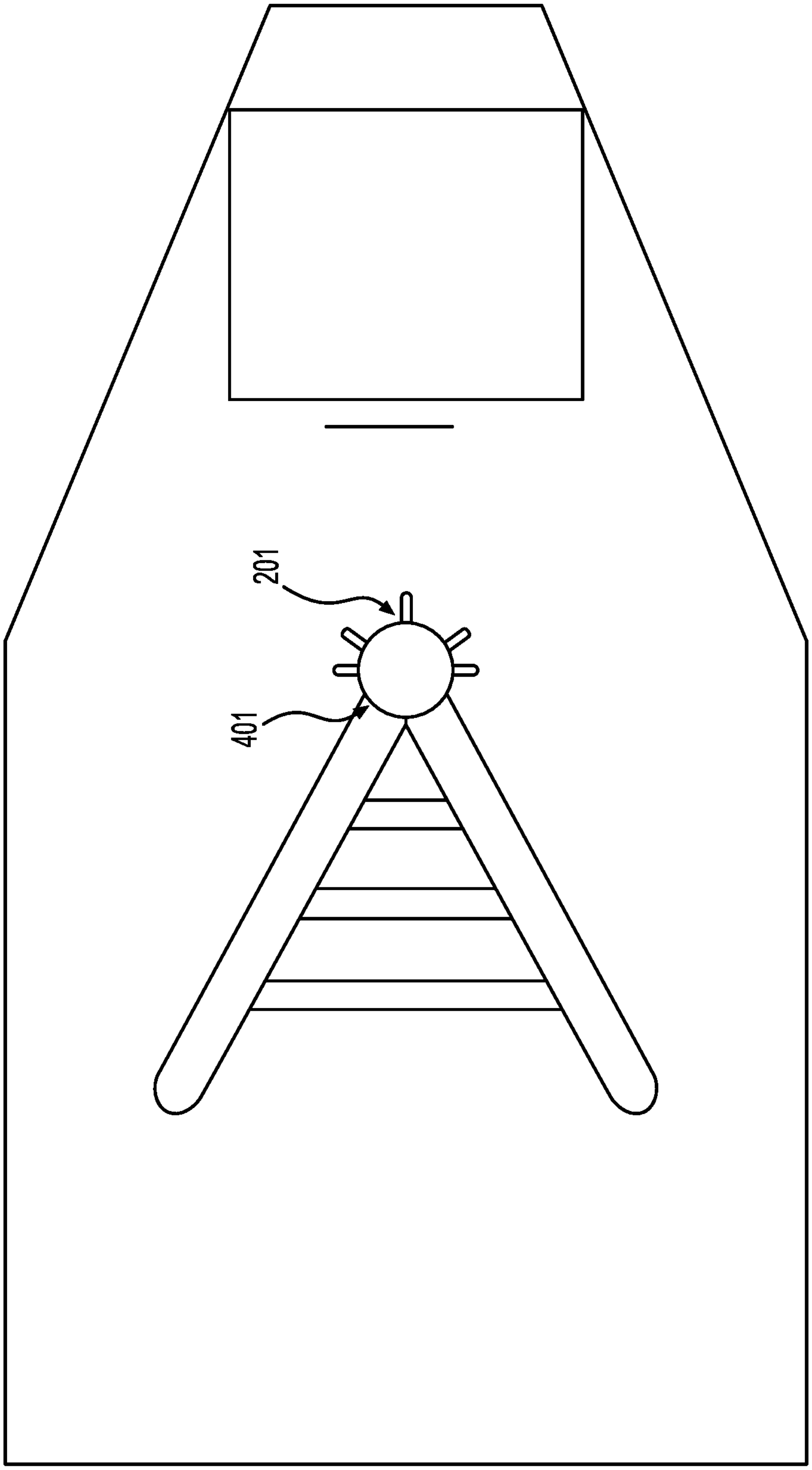
FIG. 5 shows an overhead view of an embodiment of the inventive fall arrest weldable staple installed on a pole.

FIG. 4 shows a side view of the inventive FAS 201 installed on a pole 401, and FIG. 5 shows an overhead view of inventive FAS 201 installed on a pole 401. The pole as shown is a ship mast that includes a pad eye 501, a hand grab 502, and an embodiment of the inventive FAS 201. The staple 201 can be installed with a slanted design at a 60 degree offset from the pad eye 501 or hand grab 502. Alternately, an embodiment of the FAS can be installed at a lower height at a 90 degree offset from the pad eye 501 or hand grab 502.

Other embodiments of the FAS 201 includes: 1) change upper staple install angle; 2) change lower staple install angle; 3) leave hand grab in original position with sufficient clearance for the weldable staple; 4) add staples to angled supports, which functions as a transition point; and 5) construction of a thinner material (i.e., 0.225" vs 0.25"). The FAS can be utilized in non-ship situations, such as in a building or on a structure, including a beam, column, floor, or equipment, and the like.

Although the invention has been described in detail with reference to certain preferred embodiments, variations and modifications exist within the spirit and scope of the invention as described and defined in the following claims.

The invention claimed is:

1. A fall arrest staple for attachment to a pole comprising:
a slanted base with a flat welding surface; and
an integral ring section extending from said base with an internal radii that accepts a carabiner
wherein said fall arrest staple produces 0.000 inch deformation at a 3600 pound vertical or horizontal working load and a 0.0013 maximum deformation at a 5000 pound vertical or horizontal working load.

2. The device of claim 1, wherein said staple is welded to a ship mast.

3. The device of claim 1, wherein said staple is welded in a perpendicular orientation to a ship deck.

4. A fall arrest staple for attachment to a pole comprising:
a slanted base with a flat welding surface; and
an integral ring section extending from said base;
wherein said base has a length of 5.25 inches and is constructed from 5/8 5456 or 5086 aluminum;
wherein said ring section has a maximum internal radii of 0.02 and accepts a carabiner; and
wherein said fall arrest staple produces 0.000 inch deformation at a 3600 pound vertical or horizontal working load and a 0.0013 maximum deformation at a 5000 pound vertical or horizontal working load.

5. The device of claim 4, wherein said staple is welded to a 4" OD×0.25" ship mast.

6. The device of claim 4, wherein said staple is welded in a perpendicular orientation to a ship deck.

7. The device of claim 4, wherein said staple is welded in a perpendicular orientation to a ship deck.

8. The device of claim 4, wherein said staple is welded with a slanted design at a 60 degree offset from a pad eye or a hand grab.

9. A fall arrest system comprising:
a fall arrest staple comprising a slanted base with a flat welding surface and
an integral ring section extending from said base;
wherein said base has a length of 5.25 inches and is constructed from 5/8 5456 or 5086 aluminum;
wherein said ring section has a maximum internal radii of 0.02;
a pole secured to a surface; and
a carabiner;
wherein said fall arrest staple is welded to said pole and said carabiner is attached to said integral ring section of said fall arrest staple;
wherein said fall arrest staple produces 0.000 inch deformation at a 3600 pound vertical or horizontal working load and a 0.0013 maximum deformation at a 5000 pound vertical or horizontal working load.

* * * * *